United States Patent Office  
3,029,286  
Patented Apr. 10, 1962

3,029,286  
EPOXY CURING AGENT  
Wilbur Lee Bressler, Lake Jackson, and Wayne E. Presley, Freeport, Tex., assignors to The Dow Chemical Company, Midland, Mich., a corporation of Delaware  
No Drawing. Filed Jan. 14, 1959, Ser. No. 786,693  
1 Claim. (Cl. 260—584)

The present invention relates to epoxy resins and is more particularly concerned with a new flexibilizing-curing agent for epoxy resins and resins prepared therefrom.

Various flexibilizers have been employed in the epoxy art to impart impact resistance and flexibility to epoxy resins. The more prominent group of flexibilizers in use today are monofunctional compounds which usually contain one epoxy group per molecule. Of this class of compounds the long chain aliphatic, i.e., over 12 carbon atoms, compounds are the most widely employed. These compounds have not been entirely satisfactory since, in order to impart the degree of flexibility necessary, large quantities of the compound must be employed and the result of such "loading" is a degradation of the other remarkable and useful properties of the epoxy resins, viz., good chemical resistance, good electrical properties, ease of cure, etc. Further, the viscosity of the compositions containing these long chain aliphatic monoepoxides is materially reduced over that of the unflexibilized resin systems. Other flexibilizers that have been employed with little or no more success than the aliphatic mono-epoxy compounds, are for example, the thermoplastic polyamides, polysulfides, fatty diamines, and the like. When these latter compounds are employed, the choice of curing agents and resin are limited as well as the ratio of flexibilizer to resin. Other disadvantages are well known to those skilled in the art.

It is therefore an object of the present invention to provide a flexibilizer for use with epoxy resins which can be employed in substantially any ratio with substantially any epoxy resin. A further object of the present invention is to provide a combination curing agent-flexibilizer composition which provides the curing agent in a substantially innocuous, non-toxic form, i.e., reduces skin sensitiveness. A still further object of the present invention is to provide an epoxy resin composition which has a longer pot life but which can be cured substantially at will. These and other objects will become apparent to those skilled in the art to which the following specification and claims pertain.

It has now been discovered that flexible epoxy resins can be obtained by curing an epoxy resin of the class which is normally rigid when cured, with an adduct of (1) a polyamine having two or more active hydrogens per molecule, and (2) a diglycidyl ether of a polyoxypropylene glycol. These adducts provide epoxy resin flexibilizer-curing agent compositions which have indefinite shelf-life, which have a reduced exotherm in curing, and which cause less skin irritation than amine curing agents heretofore available.

Substantially any of the well known polyamines now used as curing agents can be employed in preparing the flexibilizer-curing agent of the present invention, so long as the amine has two or more hydrogen atoms per molecule attached to nitrogen atoms. Thus, one can employ the alkylenediamines, such as, ethylenediamine, propylenediamine, and the like; the dialkylenetriamines, such as diethylenetriamine, dipropylenetriamine, bis(cyanoethyl) diethylenetriamine, and the like; the polyalkylenepolyamines, such as trialkylenetetramine, tetralkylenepentamine, and their mono-, di-, tri- and tetranitrogen-substituted derivative, i.e., N,N',N'',N'''-tetracyanoethyltriethylenetetramine, and the like. The epoxy compound is preferably employed in from 0.5 to about 0.8 mole per mole of amine. It is to be understood that less than 0.5 mole of epoxide can be employed, however, the resulting composition then contains free amine. This latter composition still provides a flexibilizer which is less volatile and less toxic than the amine alone and imparts the flexibilizing features since some adduct is formed.

Substantially any diglycidyl ether of a polyoxyalkylene glycol compound can be employed in preparing the adduct of the present invention. Thus, one can employ the diglycidyl ether of polyoxyalkylene glycols, such as polyoxyethylene glycols, polyoxypropylene glycols, polyoxybutylene glycols, mixtures of two or more polyoxyalkylene glycols, polyoxyalkylene glycols containing two or more different oxyalkylene groups wherein the different groups are either randomly arranged or are segregated to form block copolymers.

The adducts of the present invention can be employed as curing and flexibilizing agents for substantially any diglycidyl ether of a polyhydric alcohol or polyol. Thus, for example, one can employ the Epons, Epon 562, 815, 820, 1007, 1004, and the like; the epoxy resins DER 331, 332, 335, 661, 664, 667, and the like; the resins, Araldite 502, 6005, 6010, 6020, 6030, and the like; or the resins, ERL 2774, 3794 or 2795 and the like. While the majority of these commercial resins are the diglycidyl ether of bisphenol A, other known epoxy resins are intended to be included herein.

In a preferred manner of carrying out the preparation of the adduct of the present invention, from 0.5 to 0.8 mole of a diepoxide of a polyoxyalkylene glycol (epoxy resin) are reacted with each mole of polyamine in a portionwise manner at a temperature of from room temperature to about 120° C. The product obtained thereby is useful for curing and flexibilizing epoxy resins.

The following examples illustrate the invention but are not to be construed as limiting.

*Example 1*

A 500 ml. reaction flask equipped with a reflux condenser, thermometer, and a means for stirring and heating, was charged with 100 grams (4.84 equivalent weights) of diethylenetriamine. The temperature of the flask was raised to 90° C. and 100 grams (0.343 epoxy equivalent) of the diglycidyl ether of polyoxypropylene glycol (Polyglycol P–400) was added dropwise thereto over a 15-minute period. During the addition, the temperature was maintained at 90° C. Upon completion of the addition, the reaction mixture was maintained at 90° C. for an additional 15 minutes. The product, an epoxy resin curing agent, had an equivalent weight, based on active hydrogens, of 44 and a viscosity of 255 cps. at 25° C.

*Example 2*

A flask equipped as in Example 1 was charged with 30 grams of diethylenetriamine (1.5 equivalents) and maintained at 90° C. 170 grams (0.50 equivalent) of the diglycidyl ether of polyoxypropylene glycol was added dropwise thereto over a 15-minute period. Upon completion of the addition, the mixture was maintained at 90° C. for an additional 15 minutes. The product, an epoxy resin curing agent, had an equivalent weight of 200 and a viscosity of 85,000 cps. at 25° C.

*Example 3*

A flask equipped as in Example 1 was charged with 60 grams (3.0 equivalents) of diethylenetriamine and maintained at 90° C. 170 grams (0.5 equivalent) of diglycidyl ether of polyoxypropylene glycol was added dropwise thereto over a 15-minute period. Upon completion of the addition, the mixture was maintained at 90° C. for an additional 15 minutes. The product, an epoxy resin curing agent, had an equivalent weight of 92 and a viscosity of 45,000 cps. at 25° C.

*Example 4*

40 grams (.22 equivalent) of epoxy resin (DER 332, having an average molecular weight of 340, and an epoxy equivalent of 177) was cured with 10 grams (.22 equivalent) of the curing agent prepared as in Example 1. The peak exotherm was 202° C., and the cured resin had the following characteristics.

| Dielectric Constant | Power Factor | Arc Resistance | Izod Impact |
|---|---|---|---|
| 3.3 | 0.03 | 65 | 0.30 |

*Example 5*

23.5 grams (.13 equivalent) of epoxy resin (DER 332, having an average molecular weight of 340, and an epoxy equivalent of 177) was cured with 26.5 grams (.13 equivalent) of the curing agent as prepared in Example 2. There was no temperature change and the cured resin had the following characteristics.

| Dielectric Constant | Power Factor | Arc Resistance | Izod Impact |
|---|---|---|---|
| 3.4 | 0.05 | 61 | 0.86 |

*Example 6*

When 44.8 grams (.25 equivalent) of epoxy resin (DER 332) was cured with 5.2 grams (.25 equivalent) of diethylenetriamine, the peak exotherm was between 210° to 220° C., and the product has the following characteristics.

| Dielectric Constant | Power Factor | Arc Resistance | Izod Impact |
|---|---|---|---|
| 4.2 | 0.10 | 63 | 0.40 |

We claim:

A process for the preparation of a polyglycol epoxide-amine liquid condensate which comprises reacting by contacting from 0.17 to 0.83 mole of a diglycidyl ether of a polyoxyalkylene glycol with one mole of a polyamine having at least two amino hydrogen atoms at a temperature of from room temperature to about 120° C.

References Cited in the file of this patent

UNITED STATES PATENTS

| 2,581,464 | Zech | Jan. 8, 1952 |
| 2,921,050 | Belanger | Jan. 12, 1960 |

FOREIGN PATENTS

| 691,543 | Great Britain | May 13, 1953 |